(12) United States Patent
Sardesai et al.

(10) Patent No.: US 10,979,213 B2
(45) Date of Patent: Apr. 13, 2021

(54) BLOCKCHAIN COMPRESSION USING SUMMARY AND PADDING BLOCKS

(71) Applicant: VERIZON MEDIA INC., New York, NY (US)

(72) Inventors: Ashish Sardesai, Ashburn, VA (US); Dante J. Pacella, Charles Town, WV (US); Lachlan Maxwell, Ashburn, VA (US); Venkata Josyula, Ashburn, VA (US); Mani Tadayon, Leesburg, VA (US)

(73) Assignee: VERIZON MEDIA INC., New York, NY (US)

( * ) Notice: Subject to any disclaimer, the term of this patent is extended or adjusted under 35 U.S.C. 154(b) by 203 days.

(21) Appl. No.: 16/224,966

(22) Filed: Dec. 19, 2018

(65) Prior Publication Data
US 2020/0204349 A1 Jun. 25, 2020

(51) Int. Cl.
*H04L 29/06* (2006.01)
*H04L 9/06* (2006.01)
*H03M 7/30* (2006.01)

(52) U.S. Cl.
CPC ............ *H04L 9/0643* (2013.01); *H03M 7/30* (2013.01); *H04L 9/0637* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 9,849,364 B2 * | 12/2017 | Tran | ........................ | A63B 69/36 |
| 10,075,298 B2 * | 9/2018 | Struttmann | ......... | G06F 21/6218 |
| 10,505,740 B2 * | 12/2019 | Struttmann | ........... | H04L 9/0637 |
| 2018/0219669 A1 * | 8/2018 | Chen | ....................... | H04L 9/002 |
| 2018/0293567 A1 * | 10/2018 | Randhawa | .......... | G06Q 10/1053 |
| 2018/0349621 A1 * | 12/2018 | Schvey | ..................... | G09C 1/00 |
| 2020/0007315 A1 * | 1/2020 | Vouk | ...................... | H04L 9/0637 |

FOREIGN PATENT DOCUMENTS

WO WO-2019029867 A1 * 2/2019 ............ H04L 9/3239

OTHER PUBLICATIONS https://blockgeeks.com/guides/smart-contracts/ (downloaded on Dec. 19, 2018).
https://blockchainhub.net/smart-contracts/ (downloaded on Dec. 19, 2018).

* cited by examiner

*Primary Examiner* — Maung T Lwin
(74) *Attorney, Agent, or Firm* — James J. DeCarlo; Greenberg Traurig, LLP

(57) ABSTRACT

Technologies for compressing a blockchain. In some examples, the technologies include removing selected blocks within a blockchain, and replacing the selected blocks with a summary block and a padding block. Each block of the selected blocks includes data in a certain state (such as data in an obsolete state). The technologies can include generating the summary block and padding blocks according to the data in the selected blocks and an original root hash included in the selected blocks and other blocks of the blockchain. The generating of the summary and padding blocks can include generating a new root hash in the summary and padding blocks that only replaces the original root hash in the summary and padding blocks. The generation of the new root hash can be based on a part of a header of a non-selected block of the blockchain directly linked to an end block of selected blocks.

20 Claims, 5 Drawing Sheets

BLOCKCHAIN COMPRESSION USING SUMMARY AND PADDING BLOCKS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Generally, the present disclosure relates to blockchain ledger growth management, and specifically, the present disclosure relates to blockchain compression using summary and padding blocks.

BACKGROUND

A blockchain is a digitized, decentralized, public ledger of digital transactions. Blockchain technology allows applications and users of the applications to keep track of digital transactions without central recordkeeping. Each blockchain node (such as a computer system connected to a network supporting blockchain technology) can receive and use a copy of the blockchain. Blockchain ledgers can constantly grow, and blocks of a blockchain are often recorded and added to the ledger in chronological order in the network.

In cases where the data associated with transactions in a blockchain is ephemeral or useable for only a short period of time, the constant growth of a blockchain ledger becomes a concern as the expired data or non-useable data provides little to no value to the application using the ledgers or the users using the application. The expired data or non-useable data can become a burden on resources of the network supporting the blockchain. And, at the rate in which blockchain ledgers can grow, the magnitude of the expired data or non-useable data can impair functionality and/or significantly degrade the performance of the application relying on the blockchain ledger. Also, as the growth of ledger chronological, the ratio of valid data on the ledger to the expired or no longer useful data is skewed towards the latter.

Another consideration is that as a blockchain grows its integrity may increase; thus, shortening a fast growing blockchain or breaking it up into smaller parts can introduce technical problems associated with blockchain integrity. For example, the ability of blockchains to maintain immutability and integrity of transactions can occur by aggregating multiple transactions within a block of the chain along with hashes of the previous blocks; thus, creating a dependency chain.

As the blockchain continues to grow the integrity of the blockchain as a whole will continue to become more integrated; and thus, the integrity of the chain improves with its growth. However, as the blockchain becomes too large to query, update, or transmit across its nodes, as well as it becomes too big for its storage resources across the nodes, its size must be managed in some manner. Also, as new nodes are added to the blockchain network, the large and growing blockchain is transmitted to the new nodes as well. This is a significant tax of a computer network's resources since blockchain networks can continue to grow.

Thus, solutions for managing the growth of blockchain ledgers are complex, especially solutions for managing the growth of blockchain ledgers that have ephemeral data or data useable for only a short period of time. Such blockchains can grow rapidly and continually.

SUMMARY

To address these shortcomings, described herein are improved systems and methods for blockchain ledger growth management through blockchain compression using summary and padding blocks, which can overcome at least the technical problems mentioned in the background section.

In general, embodiments disclosed herein can overcome such technical problems using a combined technical solution of: (1) by removing selected blocks, such as blocks that are considered obsolete by the systems, and (2) replacing the removed selected blocks with summary and padding blocks that maintain data integrity and at least some information associated with the removed blocks. The technical solution can provide an efficient and effective way of pruning obsolete or "stale" data from a blockchain while maintaining its integrity by creating summary blocks and a padding block filled with enough data to recreate the previous header hash for the last current, "non-stale", and non-summarized block.

In summary, examples of the systems and methods disclosed herein provide specific technical solutions to at least the technical problems mentioned in the background section and other parts of the application as well as other technical problems not described herein but recognized by those of skill in the art.

In accordance with one or more embodiments, this disclosure provides computerized methods for blockchain compression using summary and padding blocks, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., application server, transactions server, client device, and the like) cause at least one processor to perform a method for a novel and improved blockchain compression using summary and padding blocks.

In accordance with one or more embodiments, a system is provided that includes one or more computing devices configured to provide functionality in accordance with one or more embodiments of a novel and improved blockchain compression using summary and padding blocks.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

In general, embodiments disclosed herein can overcome such technical problems using a combined technical solution of: (1) by removing selected blocks, such as blocks that are considered obsolete by the systems, and (2) replacing the removed selected blocks with summary and padding blocks that maintain data integrity and at least some information associated with the removed blocks. The technical solution can provide an efficient and effective way of pruning obsolete or "stale" data from a blockchain while maintaining its integrity by creating summary blocks and a padding block filled with enough data to recreate the previous header hash for the last current, "non-stale", and non-summarized block.

In summary, examples of the systems and methods disclosed herein provide specific technical solutions to at least the technical problems mentioned in the background section and other parts of the application as well as other technical problems not described herein but recognized by those of skill in the art.

Figure 1:
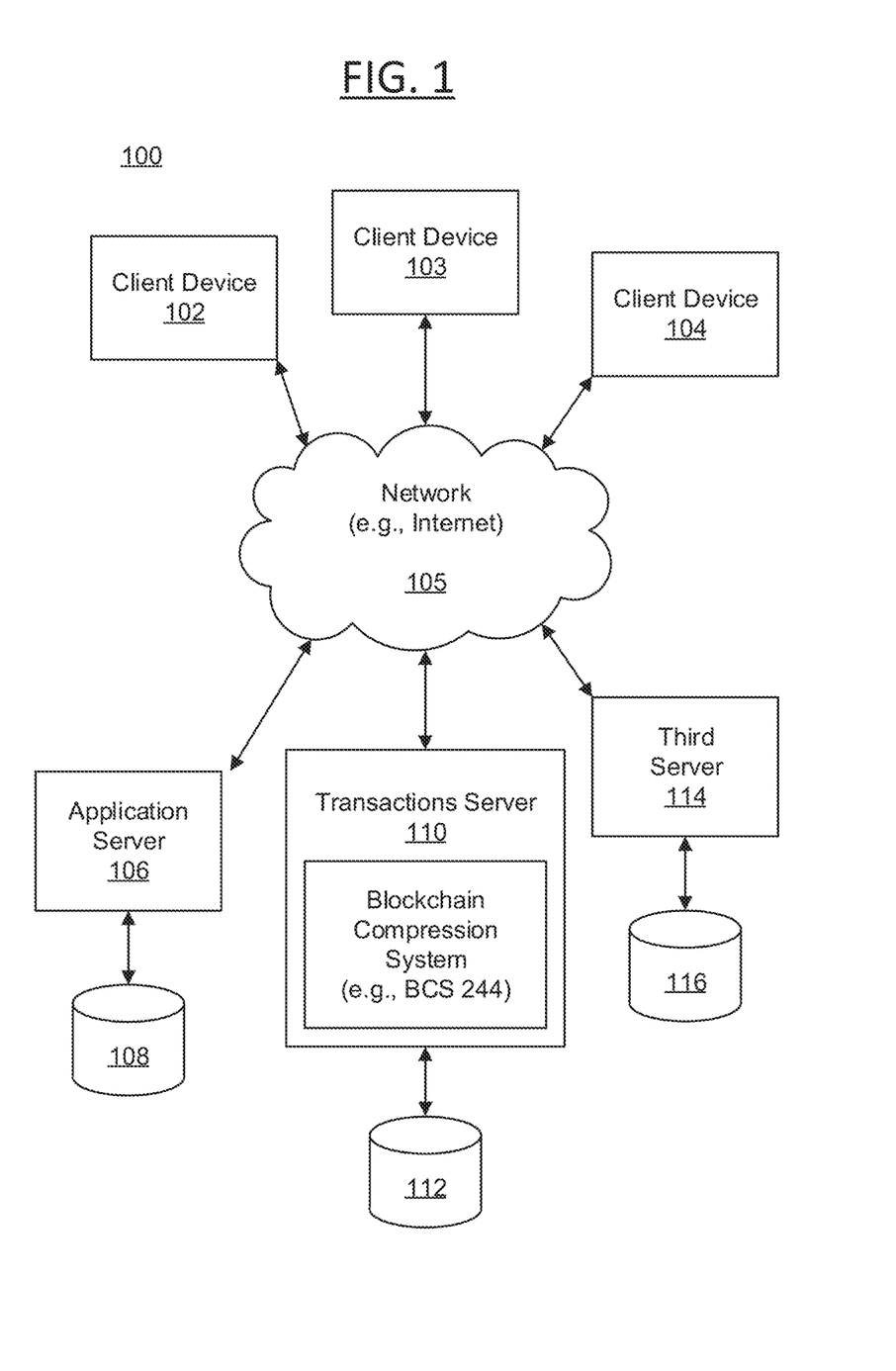
FIG. 1 is a schematic diagram illustrating an example of a network (which includes elements that can implement blockchain ledger growth management and compression) within which systems and methods disclosed herein can be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")—network 105, client devices 102-104 (e.g., such as handheld or mobile devices, Internet of Things devices, etc.), application server 106 communicatively coupled to database 108 used by the application server, transactions server 110 including a blockchain compression system (such as the blockchain compression system 244, BCS 244, depicted in FIG. 2) and communicatively coupled to database 112 used by the transactions server, and third server 114 communicatively coupled to database 116 use by the third server. Each of the servers 106, 110, and 114 can include a device that includes a configuration to perform at least some of the operations of process 300 depicted in FIG. 3 and operations 400 and 500 illustrated in FIGS. 4 and 5 respectively. Embodiments of client devices 102-104 and servers 106, 110, and 114 are described in more detail below.

Generally, client devices 102-104 can include virtually any computing device capable of receiving and sending a message over a network, such as network 105—which could include a wireless network—, or the like. Client devices 102-104 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102-104 and the servers 106, 110, and 114 can each include at least one client application that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client devices 102-104 and the servers 106, 110, and 114 can each uniquely identify themselves through any of a variety of mechanisms. Client devices can be identifiable via a phone number, Mobile Identification Number (MIN), an electronic serial number (ESN), or another type of device identifier. Servers can be identifiable via an electronic serial number (ESN) or another type of device identifier.

In general, client devices 102-104 and servers 106, 110, and 114 can be capable of sending or receiving signals, such as via a wired or wireless network, or can be capable of processing or storing signals, such as in memory as physical memory states.

Network 105 is configured to couple devices 102-104 and servers 106, 110, and 114, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications. A CDN or ADN can also enable an entity to operate or manage another's site infrastructure, in whole or in part.

The servers 106, 110, and 114 can include a device that includes a configuration to provide content such as interactive content via a network to another device. Such server(s) can, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

The servers 106, 110, and 114 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Also, servers 106, 110, and 114 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models can be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

Servers 106, 110, and 114 can be capable of sending or receiving signals, such as via a wired or wireless network, or can be capable of processing or storing signals, such as in memory as physical memory states. Devices capable of operating as a server can include, as examples, dedicated rack-mounted servers, desktop computers, laptop computers, set top boxes, integrated devices combining various features, such as two or more features of the foregoing devices, or the like. Servers can vary widely in configuration or capabilities, but generally, a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeB SD, or the like.

In some embodiments, users are able to access services provided by servers 106, 110, and 114. This can include in a non-limiting example, authentication servers, search servers, email servers, social networking services servers, SMS servers, IM servers, MMS servers, exchange servers, photo-sharing services servers, and travel services servers, via the network 105 using their various client devices. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by servers 106, 110, and 114. Thus, servers 106, 110, and 114 can store various types of applications and application related information including application data and user profile information (e.g., identifying and behavioral information associated with a user). It should also be understood that servers 106, 110, and 114 can also store various types of data related to content and services provided by an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 110, and 114.

Moreover, although FIG. 1 illustrates servers 106, 110, and 114 as single computing devices, respectively, the disclosure is not so limited. For example, one or more functions of servers 106, 110, and 114 can be distributed across one or more distinct computing devices. Moreover, in one embodiment, servers 106, 110, and 114 can be integrated into a single computing device, without departing from the scope of the present disclosure.

Figure 2:
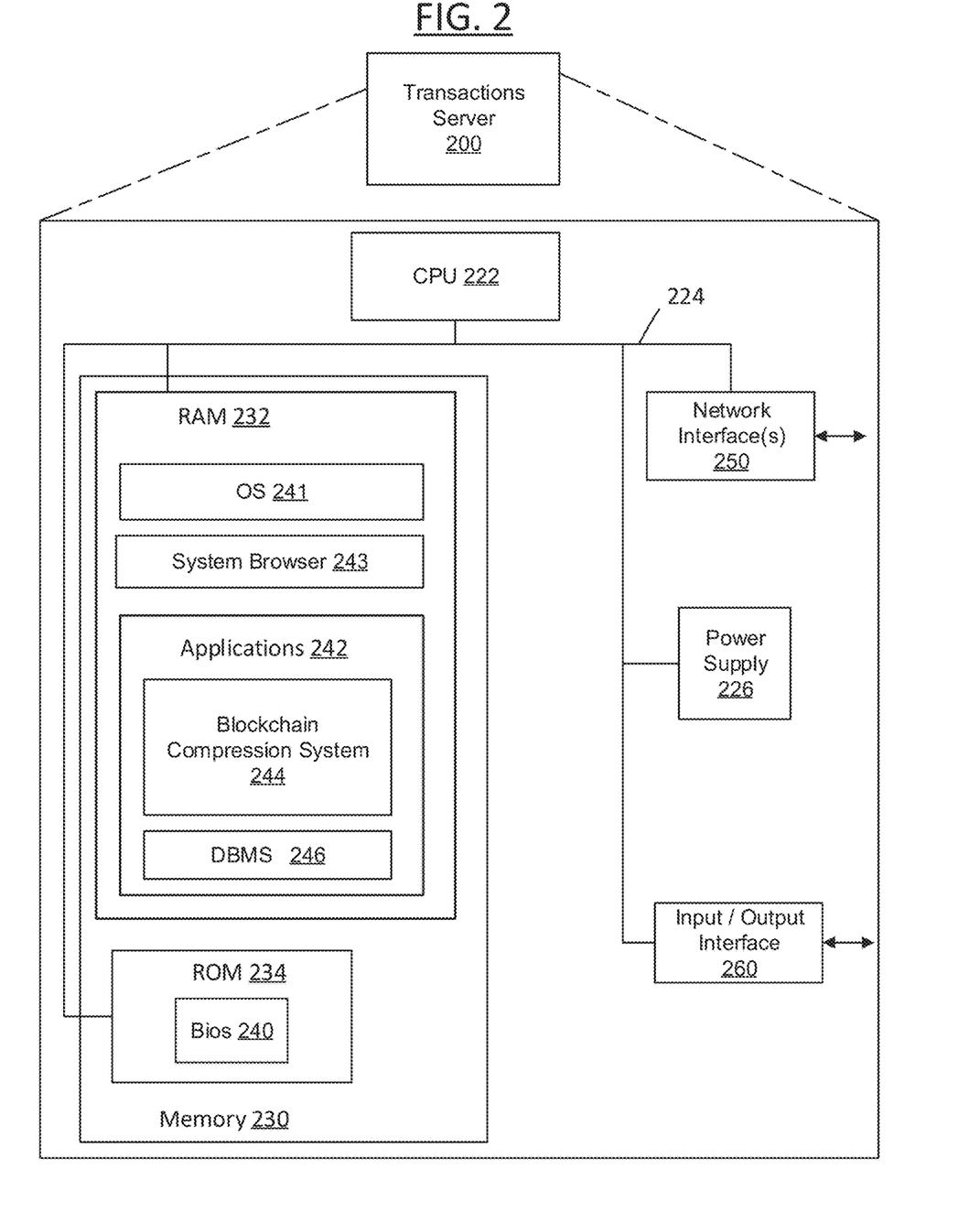
FIG. 2 is a schematic diagram illustrating an example of a transactions server (such as transactions server 110), in accordance with some embodiments of the present disclosure.

FIG. 2 is a schematic diagram illustrating a transactions server 200 showing an example embodiment of a server that can be used within the present disclosure. The transactions server 200 can include many more or less components than those shown in FIG. 2. However, the components shown are sufficient to disclose an illustrative embodiment for implementing some aspects the present disclosure. The transactions server 200 can represent, for example, the transaction server discussed above in relation to FIG. 1.

As shown in the figure, transactions server 200 includes a processing unit (CPU) 222 in communication with a mass memory 230 via a bus 224. Transactions server 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to transactions server 200. A rechargeable or non-rechargeable battery can be used to provide power. The power can also be provided by an external power source, such as an AC adapter or a powered docking cradle that supplements and/or recharges a battery. Transactions server 200 can optionally communicate with a base station (not shown), or directly with another computing device. Network interface 250 includes circuitry for coupling transactions server 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of server 200. The mass memory also stores an operating system 241 in RAM 232 for controlling the operation of server 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs.

Figure 3:
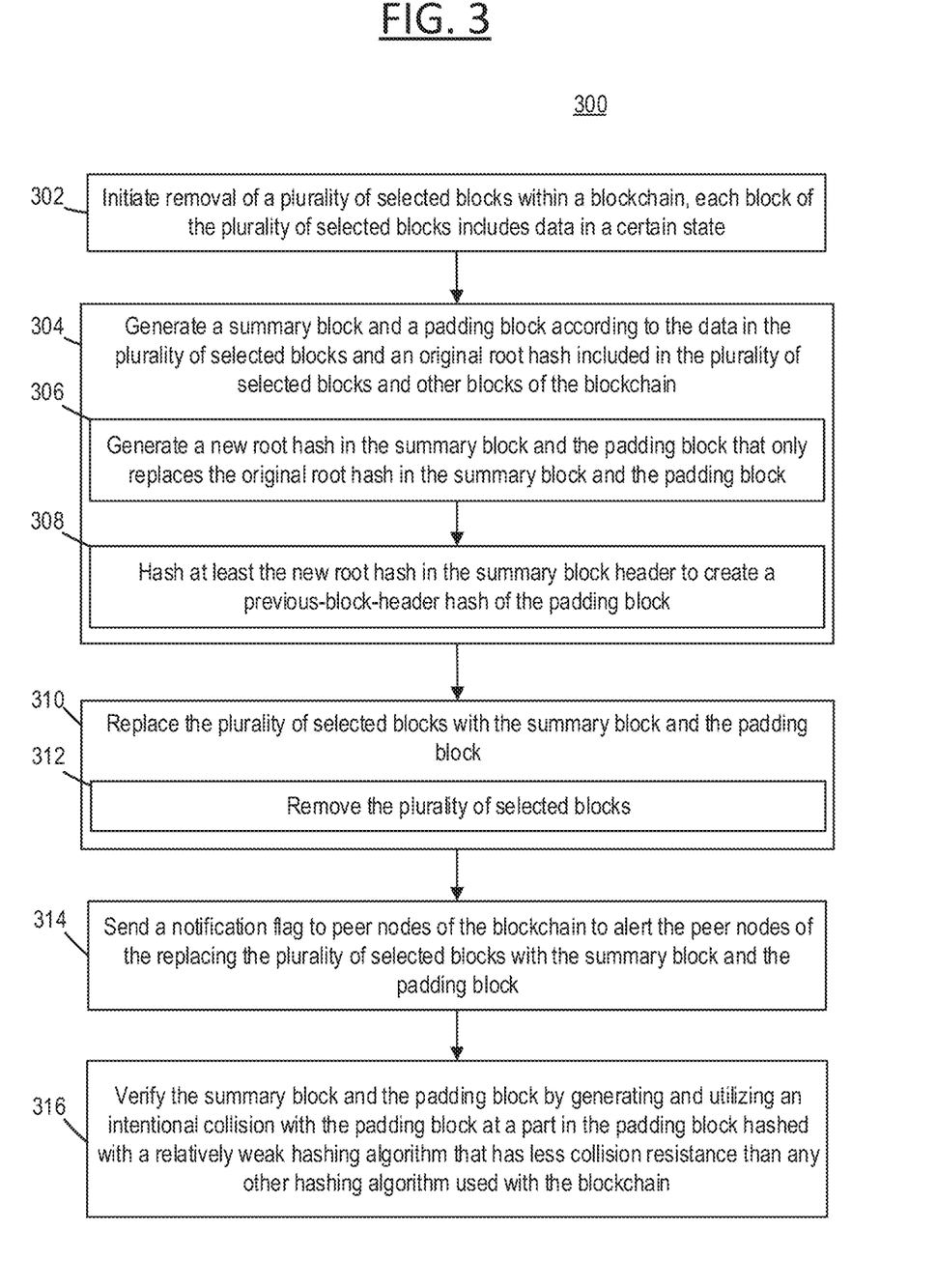
FIG. 3 is a flowchart illustrating an example method, in accordance with some embodiments of the present disclosure.
Figure 4:
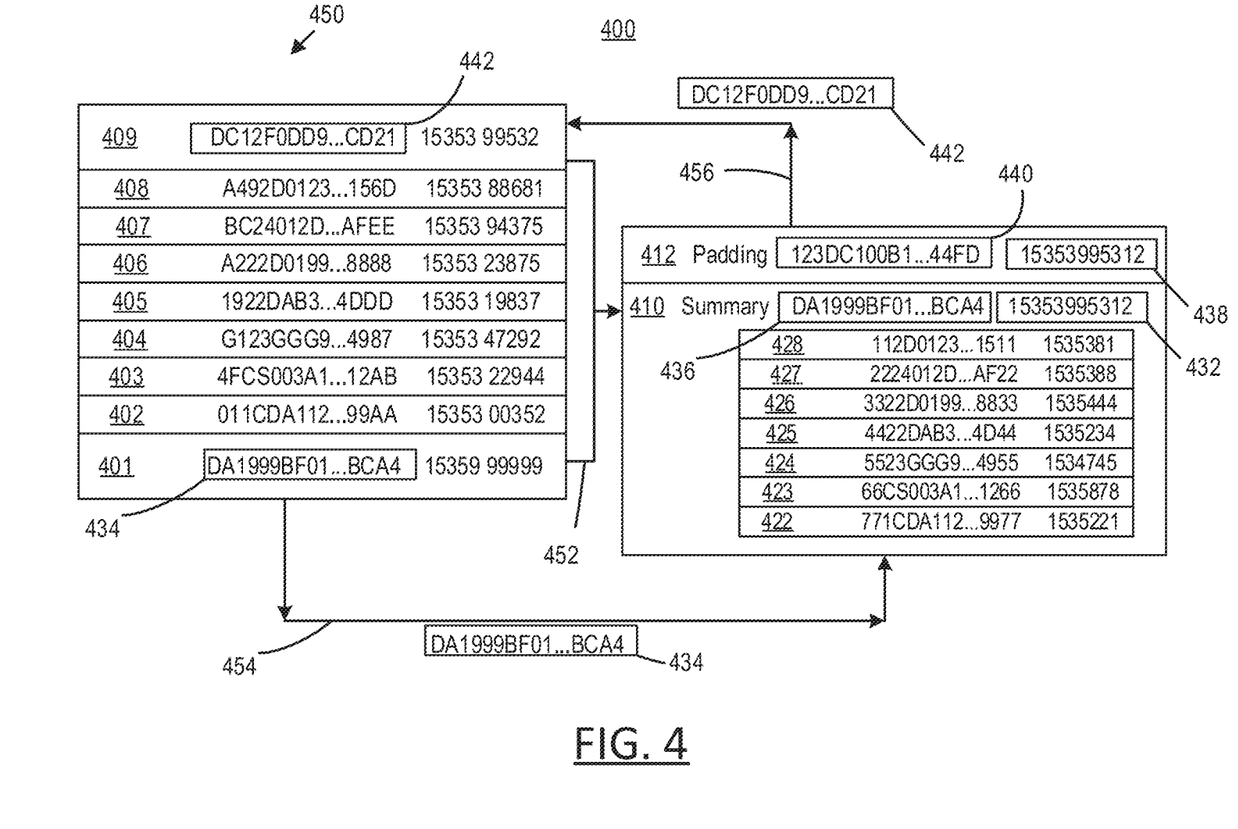
FIGS. 4 and 5 are schematic diagrams illustrating example operations in accordance with some embodiments of the present disclosure.
Figure 5:
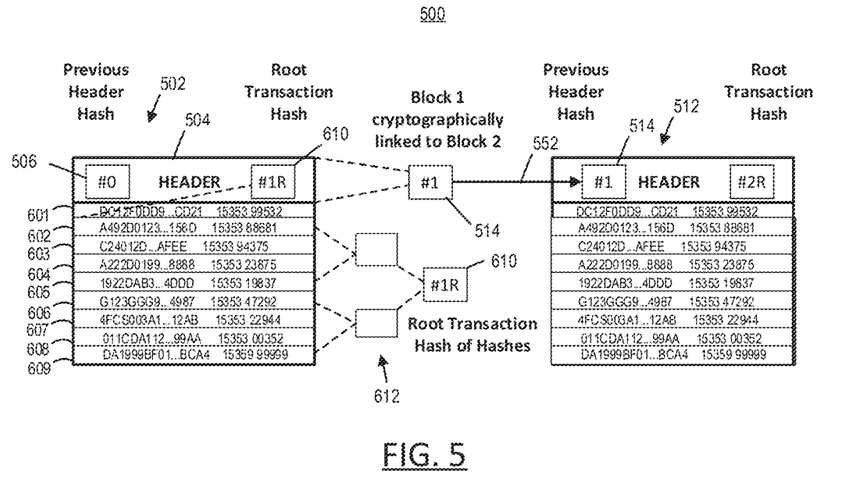

The mass memory also stores a system browser in RAM 232 for controlling operations of a system browser 243 and applications 242, such as blockchain compression system 244 (which can perform many of the operations described herein in relation to FIGS. 3-5) and a database management system 246 (which can manage a database, such as database 112, that can be used for storing and organizing data of the blockchain described herein). Also, in some embodiments, multiple servers (such as each of the servers 106, 110, and 114) can include a databased management system that can be used for storing and organizing, in respective databases, data of the blockchain described herein.

Memory 230 further includes one or more data stores, which can be utilized by server 200 to store, among other things, the system browser 243, the applications 242 and/or other data. For example, data stores can be employed to store information that describes various capabilities of server 200. The information can then be provided to another device based on any of a variety of events, including being sent as part of a header during a communication, sent upon request, or the like. At least a portion of the capability information can also be stored on a disk drive or other storage medium (not shown) within server 200.

Applications 242 can include computer executable instructions which, when executed by server 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, smart contracts, word processing programs, security applications, spreadsheet programs, games, search programs, and so forth.

Having described components of the architecture example employed within the disclosed systems and methods, the components' operations with respect to the disclosed systems and methods will now be described below with reference to FIGS. 3-5.

In FIG. 3, process 300 details steps performed by one or more servers (such as one or more of the servers described herein, e.g., servers 106, 110, 114, and 200) in accordance with some embodiments of the present disclosure. The steps are for a method for compressing a blockchain. Process 300 begins with step 302, which includes one or more server computers initiating removal of a plurality of selected blocks within a blockchain.

Each block of the plurality of selected blocks includes data in a certain state (such as an obsolete state or a "stale" state). For example, the data in a block of the plurality of selected blocks can be considered in the certain state by the server(s) when the data reaches a predetermined age. Also, the data in a block of the plurality of selected blocks can be considered in the certain state by the server(s) when the data has expired according to a predetermined criterion. For instance, respective data in a block of the plurality of selected blocks can be consider in the certain state when the respective data is associated with or includes a predetermined criterion such as a certain version or range of versions of an application using the blockchain, a certain data format of the application, a certain data format type, a certain data contents type, a certain service type, or a right to remove tag. Also, for example, respective data in a block of the plurality of selected blocks can be consider in the certain state when the respective data is associated with or includes a plurality of criteria, such as any combination of the aforesaid criteria.

Also, in some embodiments, versioning, such as versioning of the application writing to the blockchain, or data format for the application can be a basis for considering a certain state of a block such as for tagging the block or associating it in an obsolete state or a "stale" state. Data item type or transaction type (such as a regulatory item that becomes obsolete when legislation expires or new legislation is written that replaces it, or any other type of data item or transaction in which its usage might form a data type that is obsolete) can also be a basis for considering a certain state of a block such as for tagging the block or associating it in an obsolete state or a "stale" state. Data related to a service type for a service no longer valuable or not supported can also be a basis for considering a certain state of a block such as for tagging the block or associating it in an obsolete state or a "stale" state. And, an institutional, legal, or governmental right to remove a record, if, for example, the record is in a self-contained block, can be a basis for considering a certain state of a block such as for tagging the block or associating it in an obsolete state or a "stale" state.

Also, the initiating of the removal of the plurality of selected blocks in step 302 can occur in different situations. For example, the initiating of the removal of the plurality of selected blocks can occur when the number of blocks in the plurality of selected blocks exceeds a threshold. Also, the initiating removal of the plurality of selected blocks can occur at a predetermined duration of time from the origination of the blockchain or the origination of a predetermined part of the blockchain. The initiating removal of the plurality of selected blocks also can occur at a scheduled time and date and/or can occur regularly and/or periodically by a system implementing the process 300 (such as by blockchain compression system 244).

In step 304, the server(s) generate a summary block and a padding block according to the data in the plurality of selected blocks and an original root hash included in the plurality of selected blocks and other blocks of the blockchain. The padding block and the summary block can include linking data that links the padding and summary blocks to the blockchain and maintains the linking between the plurality of selected blocks and the blockchain. In some embodiments, a new root hash in the summary and padding blocks links the summary block and the padding block to the blockchain.

In step 306, the server(s) generate a new root hash in the summary block and the padding block that only replaces the original root hash in the summary block and the padding block. The generation of the new root hash can be based on a part of a header of a non-selected block of the blockchain directly linked to an end block of the plurality of selected blocks. The part of the header of the non-selected block can include the original root hash of the blockchain and a previous-block-header hash.

The previous-block-header hash can be or be derived from a Merkle-Tree-derived hash of the end block of the plurality of selected blocks. The Merkle-Tree-derived hash can be derived from a Merkle Tree based on transactions in the end block of the plurality of selected blocks. The Merkle Tree is a hash tree where leaf nodes can include individual transactions in of a single block of a blockchain. The leaf nodes of the tree can be concatenated and hashed to produce a next-level hash. In a binary tree, the next-level hashes are reduced pair-wise. This reduction can be iterative until the tree is reduced to a single root hash.

In some embodiments, the previous-block-header hash can be or be derived from a different type of hash than a Merkle-Tree-derived hash. For example, instead of a hash derived from a Merkle Tree, the previous-block-header hash can be or be derived from a hash derived from a Patricia Tree, Fast Merkle, or Merklix based on transactions in the end block of the plurality of selected blocks.

The summary block can include the new root hash in a header of the summary block. The summary block also can include hashes of transaction data from the plurality of selected blocks. The new root hash can be at least partially derived from the hashes of selected transaction data from the plurality of selected blocks. In some embodiments, a root hash is for derivation of the Merkle Tree of a block.

In some embodiments, the summarized selected blocks are ordered similar to transactions in the summary block. Thus, a first selected block of the plurality of selected blocks can become a first summary transaction in a summary block. And, a second selected block of the plurality of selected blocks can become a second summary transaction in the summary block or another summary block, and so on. This transformation of selected blocks to one or more tractions within a summary block allows summarization into a single block or multiple blocks. The transactions can be hashed to further reduce the size of the summary block(s). Whether the selected blocks are summarized in to one or multiple summary blocks, the aggregate of the summary blocks or the single block will still be less bits than the original form of the selected blocks. In some examples, block length restrictions may require that the summary block be multiple blocks.

Once all the selected blocks are hashed and reduced to transactions in the summary block(s), a Merkle Tree can be created to generate a root hash for a summary block header. The summary block header can be hashed to generate a previous-block-header-hash for a padding block or subsequent summary block in the event that there are multiple summaries in a chain. This maintains the chain integrity from the genesis or smallest height non-selected block to the next highest non-selected block (e.g., see FIG. 4, wherein block 401 is a genesis block and block 409 is next highest non-obsolete block, and wherein blocks 402-408 are example blocks of a plurality of selected blocks—such as a plurality of selected obsolete blocks or "stale" blocks).

In step 308, the server(s) hash at least the new root hash in the summary block header to create a previous-block-header hash of the padding block. The previous-block-header hash of the padding block can be a same hash value as the previous-block-header hash of the non-selected block or a hashed value derived from the previous-block-header hash of the non-selected block. In some embodiments, the previous-block-header hash of the padding block and the previous-block-header hash of the non-obsolete original block provide the link between the summary and padding blocks and the non-obsolete original block of the blockchain; and therefore, in such embodiments, these hashes provide the linking of the summary and padding blocks to the non-summarized remainder of the blockchain.

In step 310, the server(s) replace the plurality of selected blocks with the summary block and the padding block. In step 312, the replacement of step 310 includes the server(s) removing the plurality of selected blocks within the blockchain. In some embodiments, the replacing the plurality of selected blocks with the summary block and the padding block can include replacing the plurality of selected blocks with the summary block and the padding block after the plurality of selected blocks are removed from the blockchain.

In step 314, the server(s) send a notification flag to peer nodes of the blockchain to alert the peer nodes of the replacing the plurality of selected blocks with the summary block and the padding block. The peer nodes of the blockchain can include any one or more of the servers described herein, e.g., servers 106, 110, 114, and 200, and/or any one or more of the client devices described herein, e.g., client devices 102, 103, and 104. In some embodiments, a notification flag is required by the system (such as by the blockchain compression system 244) to be sent to all peer nodes to alert that there are updates to the blockchain that need to be downloaded and validated. Also, which parts need to be updated (such as parts that do not need a full download) can be sent. Further, the new or updated data of the blockchain can be sent from the originating blockchain node (or nodes), where the process 300 is initially performed, to the other peer nodes of the blockchain network. Once the other peer nodes received the new or updated data along with the notification flag, the other nodes can be updated accordingly such as by new iterations of the process 300.

In step 316, the server(s) verify the summary block and the padding block by generating and utilizing an intentional collision with the padding block at a part in the padding block hashed with a relatively weak hashing algorithm that has less collision resistance than any other hashing algorithm used with the blockchain. The input for the intentional collision can include random padding data of the padding block and an original hash at a point of attachment of the plurality of selected blocks to the blockchain. The relatively weak hashing algorithm can be or include any relatively weak hashing algorithm such as a MD5 or MD4 hashing algorithm. The verifying of the summary block and the padding block by utilizing the intentional collision can occur periodically at predetermined time periods or it can happen sporadically in some embodiments such as after a certain number of updates to the blockchain.

In some embodiments, collision is with the padding block. In such examples, the padding block can include the previous-block-header hash from summary block. MD5 and MD4 can be examples of weaker algorithms for hashing the tested part of the padding block.

The system (such as blockchain compression system 244) can also use a new custom algorithm specifically weakened for collision usage. The custom algorithm for which a collision can be found can be designed according to tradeoffs of minimizing security risk and achieving a collision in a reasonable amount of time. The priority of such tradeoff can change or be different from one implementation of the system to another.

Also, after step 314 and the blockchain at the peer nodes is summarized and padded, each of the peer nodes can perform its own verification of the summary block and the padding block as in step 316. Verification can occur after the collision is found and used in the padding block. Once summary and padding blocks are submitted to the network, the validation process can check to determine if the hash is correct and previous-block-header hash is correct. Implicit consensus can occur once the majority of nodes accepts the replacement blocks as valid.

FIGS. 4 and 5 depict schematic diagrams illustrating example operations 400 and 500 in accordance with some embodiments of the present disclosure for compressing a blockchain. It is to be understood that a complete blockchain is not depicted in these drawings.

Specifically, FIG. 4 illustrates the forming of the summary and padding blocks of blockchain 450, and FIG. 5 shows blockchain linking between two blocks, block 502 and block 512. Block 502 includes header 504 and previous-blockheader hash 506 as well as other parts usually associated with a block of a blockchain (such as blockchain 450). Block 512 also includes a header and previous-block-header hash 514 as well as other parts usually associated with a block of a blockchain.

In FIG. 4, selected blocks 402-408 have been selected for summarizing and padding since the blocks have been determined as having data in a certain state (or multiple certain states)—similar to the selected blocks in step 302 of FIG. 3. The certain state can relate to data determined as obsolete or "stale" (e.g., determined based on expiry corresponding to timestamps too far back from a current time). The blockchain 450 can be compressed by removing selected blocks 402-408. The compression operation of operations 400 is shown by operation 452.

However, a chain in the linking of blocks 401-409 is broken after removal of the selected blocks 402-408. Linking of the chain of blocks 401-409 is illustrated by the linking operation 552 shown in FIG. 5, which shows linking of two blocks. In FIG. 5, a link in a chain is created by previous-block-header hash 514 of block 512. The previous-block-header hash 514 is the same or a derivative of the root hash for block 502, root hash 610. This illustrates how blocks of a blockchain, such as blocks 401-409, are immutable through cryptographic hash linking before they are broken.

Also, blocks of a blockchain, such as blocks 401-409, can be linked by hashing all transactions in the blocks and concatenating and hashing all subsequent hashes in a pairwise fashion such a through a Merkle Tree. Such actions can be a part of operation 452. The result of operation 452 is at least one respective hash value for each of selected blocks 402-408. Each of the at least one hash value for each of selected blocks 402-408 is essentially or is used to derive the transactions 422-428 of summary block 410. To put it another way, respective Merkle Trees of operation 452 reduces the data and transactions of each block of the blocks selected 402-408 into respective one or more hashes for each selected block—the one or more hashes of each block of selected blocks 402-408 being a transaction of summary block 410.

With the summary block 410, using a Merkle Tree, the transactions 422-428 are hashed and the hashes are combined pairwise and the pairs further hashed until the transactions and hashes are reduced into root hash 432 of the summary block 410. The root hash 410 reduced from the Merkle Tree of operation 452 is a part of the block header of the padding block 412. If even a single character has changed in any transaction of the summary block, when the block is distributed globally, the root hash for the summary block 410 will be entirely different; and thus, can be determined easily as invalid or tampered with. This is also the case for the padding block 412.

The steps of operation 452 are somewhat analogous to hashing using a Merkle tree to reduce transactions of a single non-summary block into a single root hash of that block, such as shown in FIG. 5. In FIG. 5, with Merkle Tree 612, the transactions 601-609 of block 502 are hashed and the hashes are combined pairwise and the pairs further hashed until the transactions and hashes are reduced into root hash 610. The root hash 610 reduced from the Merkle Tree 612 is a part of the block header 504 of the block 502. If even a single character has changed in any transaction when the blocks 502 and 512 are distributed globally, the root hash 610 or hash 514 will be entirely different; and thus, block 502 can be determined easily as invalid or tampered with.

With respect to FIG. 5 and individual blocks of a blockchain, the previous-block-header hash 514 can be a hash of the entire contents of the previous header 504, including the root hash 610 of the previous block 502; and therefore, the previous-block-header hash 514 links a latter block 512 to a block 502 immediately prior to the latter block. Such a link can be from one latter block to its respective previous block repeated down the blockchain. This can link transactions to their respective block and all blocks of the blockchain together. A system, such as the blockchain compression system 244 or a ledger management system, can quickly compare transactions and hashes to determine integrity of the chain by checking downstream blocks. Maliciously changing, for example, one digit in one transaction, and passing the transaction off as valid requires re-computing all header hashes before redistribution—which is nearly impossible.

The aforesaid linking technique illustrated in FIG. 5 can be analogously used to repair and/or replace the linking of removed blocks 402-408 from blockchain 450 when the blocks are removed in operation 452. Again, the contents of the removed blocks can be reduced to a set of hashes and transformed into transactions of summary block 410 in operation 452. In FIG. 4, each transaction in the summary block 410 (transactions 422-428) represents a summarized single block of the blocks 402-408 with all its transactions. The data of the blocks 402-408 can be variable in size, and the data of each one of the transactions of the summary block 410 can be the same size or variable. A new root hash 432 for the summary block 410 is calculated using a Merkle Tree of the transactions 422-428. And, a genesis block header hash 434 of genesis block 401 is used as a previous-block-header hash 436 for summary block 410, which is shown by the linking operation 454 of operations 400. And, in turn, the new root hash 432 of the summary block 410 becomes the previous-block-header hash 438 of padding block 412.

A generated padding hash 440 of padding block 412 is a link to a header block hash 442 of non-summarized block 409, shown by linking operation 456 of operations 400. In other words, the generation of padding hash 440 is included in the linking operation 456.

Also, the generating of the padding hash 440 can allow for part of step 316, in that it can allow for generating and utilizing an intentional collision with the padding block 412 at a part in the padding block hashed with a relatively weak hashing algorithm that has less collision resistance than any other hashing algorithm used with the blockchain. For instance, the hashing used to generate padding hash 440 can be the hashing on the part in the padding block hashed with a relatively weak hashing algorithm. The input for the intentional collision can include random padding data of the padding block and an original hash at a point of attachment of the plurality of selected blocks to the blockchain, which can be header block hash 442 of non-summarized block 409. This creates a link between the padding and summary blocks 410 and 412 and non-summarized block 409, shown by linking operation 456 (which includes at least the generation of padding hash 440). The padding hash 440 can include an encryption of the previous-block-header hash of block 408 or a derivative thereof.

In some embodiments, the padding hash 440 is the inverse or nearly the inverse to a nonce of padding block 412 that can be used by a mining operation of a node of the blockchain to find a nonce of the padding block. The random data of padding block 412 can used as input for generating and running a collision with the padding hash 440 by inputting random data into a relative weak hashing algorithm until the result is the padding hash 440.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method for compressing a blockchain, comprising:
   initiating removal of a plurality of selected blocks within a blockchain, each block of the plurality of selected blocks comprises data in a certain state;
   generating a summary block and a padding block according to the data in the plurality of selected blocks and an original root hash included in the plurality of selected blocks and other blocks of the blockchain,
      the generating the summary block and the padding block comprises generating a new root hash in the summary block and the padding block that only replaces the original root hash in the summary block and the padding block,
      the generation of the new root hash is based on a part of a header of a non-selected block of the blockchain directly linked to an end block of the plurality of selected blocks, and
      the new root hash links the summary block and the padding block to the blockchain; and
   replacing the plurality of selected blocks with the summary block and the padding block.

2. The method of claim 1, wherein the part of the header of the non-selected block comprises the original root hash of the blockchain and a previous-block-header hash,
   the previous-block-header hash being or being derived from a Merkle-Tree-derived hash of the end block of the plurality of selected blocks, and
   the Merkle-Tree-derived hash being derived from a Merkle Tree based on transactions in the end block of the plurality of selected blocks.

3. The method of claim 1, wherein the summary block comprises the new root hash in a header of the summary block, wherein the summary block comprises hashes of transaction data from the plurality of selected blocks, and wherein the new root hash is at least partially derived from the hashes of selected transaction data from the plurality of selected blocks.

4. The method of claim 3, the method further comprising hashing at least the new root hash in the summary block header to create a previous-block-header hash of the padding block.

5. The method of claim 4, wherein the previous-block-header hash of the padding block is a same hash value as the previous-block-header hash of the non-selected block or a hashed value derived from the previous-block-header hash of the non-selected block.

6. The method of claim 1, wherein the data in a block of the plurality of selected blocks is in the certain state when the data reaches a predetermined age.

7. The method of claim 1, wherein respective data in a block of the plurality of selected blocks is in the certain state when the respective data is associated with or includes a predetermined criterion selected from the group consisting of a certain version or range of versions of an application using the blockchain, a certain data format of the application, a certain data format type, a certain data contents type, a certain service type, and a right to remove tag.

8. The method of claim 1, wherein removing the plurality of selected blocks comprises removing the plurality of selected blocks when the number of blocks in the plurality of selected blocks exceeds a threshold.

9. The method of claim 1, wherein removing the plurality of selected blocks comprises removing the plurality of selected blocks at a predetermined duration of time from the origination of the blockchain or the origination of a predetermined part of the blockchain.

10. The method of claim 1, wherein removing the plurality of selected blocks comprises initiating removing the plurality of selected blocks at a scheduled time and date.

11. The method of claim 1, further comprising verifying the summary block and the padding block by generating and utilizing an intentional collision with the padding block at a part in the padding block hashed with a relatively weak hashing algorithm that has less collision resistance than any other hashing algorithm used with the blockchain.

12. The method of claim 11, wherein the input for the intentional collision comprises random padding data of the padding block and an original hash at a point of attachment of the plurality of selected blocks to the blockchain.

13. The method of claim 11, wherein the relatively weak hashing algorithm is selected from the group consisting of MD5 and MD4 hashing algorithms.

14. The method of claim 11, wherein verifying the summary block and the padding block by utilizing the intentional collision occurs periodically at predetermined time periods.

15. A non-transitory computer-readable storage medium tangibly encoded with computer-executable instructions, that when executed by a processor associated with a computing device, performs a method, the method comprising:
   removing a plurality of selected blocks within a blockchain, each block of the plurality of selected blocks comprises data that has expired according to a predetermined criterion;
   generating a summary block and a padding block according to the data in the plurality of selected blocks and an original root hash included in the plurality of selected blocks and other blocks of the blockchain; and
   replacing the removed plurality of selected blocks with the summary block and the padding block.

16. The non-transitory computer-readable storage medium of claim 15, wherein the method further comprises sending a notification flag to peer nodes of the blockchain to alert the peer nodes of the replacing the plurality of selected blocks with the summary block and the padding block.

17. The non-transitory computer-readable storage medium of claim 16, wherein the method further comprises verifying the summary block and the padding block by generating and utilizing an intentional collision with the summary block and the padding block at a point in the summary block and padding block hashed with a relatively weak hashing algorithm that has less collision resistance than any other hashing algorithm used with the blockchain, and wherein each of the peer nodes runs the verification of the summary block and the padding block.

18. A computing device, comprising:
   a processor; and
   a non-transitory computer-readable storage medium for tangibly storing thereon program logic for execution by the processor, the program logic comprising:
   executable logic for removing a plurality of selected blocks within a blockchain, each block of the plurality of selected blocks comprises data that has expired according to a predetermined criterion;
   executable logic for generating a summary block and a padding block according to the data in the plurality of selected blocks and an original root hash included in the plurality of selected blocks and other blocks of the blockchain; and
   executable logic for replacing the removed plurality of selected blocks with the summary block and the padding block,
      the padding block and the summary block comprise linking data that links the padding and summary blocks to the blockchain and maintains the linking between the plurality of selected blocks and the blockchain.

19. The computing device of claim 18, wherein the program logic further comprises executable logic for verifying the summary block and the padding block by generating and utilizing an intentional collision with the summary block and the padding block at a point in the summary block and padding block hashed with a relatively weak hashing algorithm that has less collision resistance than any other hashing algorithm used with the blockchain, and wherein the relatively weak hashing algorithm is selected from the group consisting of MD5 and MD4 hashing algorithms.

20. The computing device of claim 18, wherein the executable logic for generating a summary block and a padding block includes executable logic for generating a new root hash in the summary block and the padding block that only replaces the original root hash in the summary block and the padding block, and wherein the generation of the new root hash is based on a part of a header of a non-selected block of the blockchain directly linked to an end block of the plurality of selected blocks.

* * * * *